United States Patent
Akahane

(10) Patent No.: US 8,873,087 B2
(45) Date of Patent: Oct. 28, 2014

(54) RECORDING DEVICE AND CONTROL METHOD FOR REPLACING FONTS WITH PRINTER FONTS CORRELATES PRINT DATA ATTRIBUTES

(75) Inventor: Hiroyuki Akahane, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 455 days.

(21) Appl. No.: 12/882,119

(22) Filed: Sep. 14, 2010

(65) Prior Publication Data
US 2011/0063671 A1 Mar. 17, 2011

(30) Foreign Application Priority Data
Sep. 15, 2009 (JP) .................. 2009-213070

(51) Int. Cl.
*G06K 15/02* (2006.01)
*G06F 3/12* (2006.01)

(52) U.S. Cl.
CPC .......... *G06F 3/1284* (2013.01); *G06K 15/1827* (2013.01); *G06K 15/1807* (2013.01); *G06F 3/1229* (2013.01); *G06F 3/1251* (2013.01); *G06F 3/1208* (2013.01)
USPC .................. 358/1.15; 358/1.11; 358/1.13

(58) Field of Classification Search
None
See application file for complete search history.

(56) References Cited

U.S. PATENT DOCUMENTS

| 2002/0060800 A1* | 5/2002 | Watanabe ............... 358/1.11 |
| 2005/0198566 A1 | 9/2005 | Takamine et al. |
| 2007/0177206 A1* | 8/2007 | Miyazawa et al. ........ 358/1.15 |
| 2007/0195337 A1* | 8/2007 | Takayama et al. ........ 358/1.2 |

FOREIGN PATENT DOCUMENTS

| JP | 08-034142 A | 2/1996 |
| JP | 2000-263860 A | 9/2000 |
| JP | 2002-269072 A | 9/2002 |
| JP | 2003-011444 A | 1/2003 |
| JP | 2003-154716 A | 5/2003 |
| JP | 2008-287333 A | 11/2008 |
| WO | 03/085509 A1 | 10/2003 |

* cited by examiner

*Primary Examiner* — Benny Q Tieu
*Assistant Examiner* — Haris Sabah
(74) *Attorney, Agent, or Firm* — Kilpatrick Townsend & Stockton LLP

(57) ABSTRACT

A recording device, a control method for a recording device, and a program can record even when recording using a font that is not internally stored by the recording device is specified. A printer 2 that records on a recording medium using a font specified by a host computer 4 has font substitution information 24C that correlates specified fonts to internal fonts based on the number of columns per line that can be recorded on the recording medium using the specified font. When a font is specified by the host computer 4, the printer 2 substitutes an internal font for the specified font based on the font substitution information 24C.

4 Claims, 4 Drawing Sheets

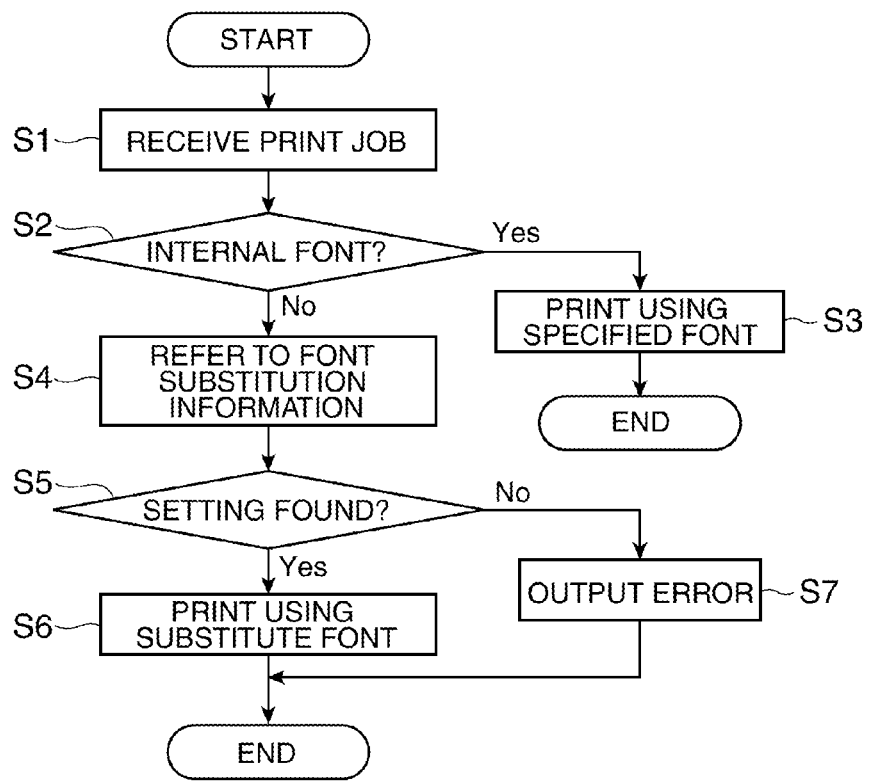
FIG. 3
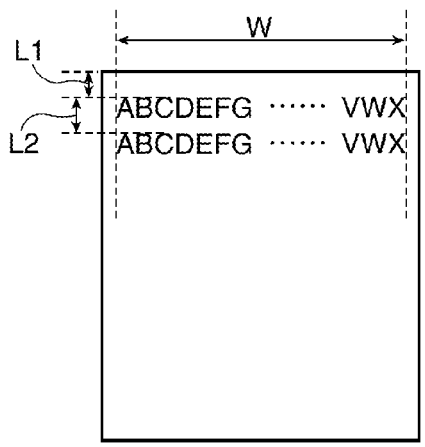
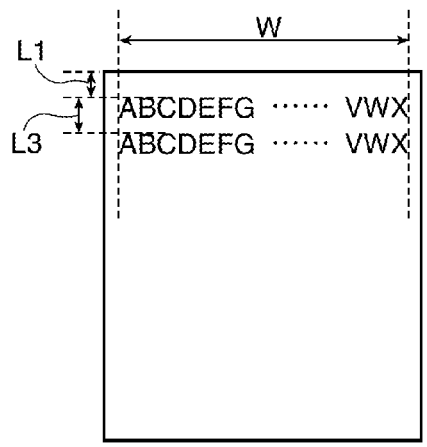
FIG. 4A   FIG. 4B

RECORDING DEVICE AND CONTROL METHOD FOR REPLACING FONTS WITH PRINTER FONTS CORRELATES PRINT DATA ATTRIBUTES

This application claims priority to Japanese Patent Application No. 2009-213070, filed Sep. 15, 2009, the entirety of which is incorporated by reference herein.

BACKGROUND

1. Technical Field

The present invention relates to a recording device that records text in a specified font, to a control method for this recording device, and to a program.

2. Related Art

Recording devices that store the fonts for recording (that is, printer fonts) internally are known from the literature. See, for example, Japanese Unexamined Patent Appl. Pub. JP-A-08-034142. When a job that specifies the font for the recording device is received from a host computer or other host device, this recording device records text using the internal font.

However, because of the limited storage capacity of the recording device, storing all fonts that could possibly be specified by the host device in the recording device is difficult. A font that is not stored internally in the recording device may still be specified by the host device. For example, when a new recording device is purchased, the internal fonts of the previously used recording device will not necessarily be installed in the new recording device. As a result, the recording device returns an operating error and cannot print when a font that is not stored internally by the new recording device is specified by the host, and the fonts that can be specified on the host must be changed. This makes it necessary to change the operating settings of the operating system or application program that is used on the host, and even this can be difficult.

SUMMARY

A recording device, a control method for a recording device, and a program according to the present invention enable recording even when recording using a font that is not installed in the recording device is specified.

A first aspect of the invention is a recording device that records characters on a recording medium according to a font specified by an externally connected device, the recording device including a plurality of internal fonts, and font substitution information that correlates the specified font to a different internal font based on the recordable column count of the specified font per line on the recording medium, and replacing the specified font with the different internal font based on the font substitution information when a font is specified by the externally connected device.

Because the font specified by an externally connected device is replaced by a different internal font that can print approximately the same number of columns per line on the recording medium in this aspect of the invention, printout with a comparable appearance that does not appear odd can be obtained without using the font specified by the externally connected device. As a result, when a command specifying a font that is not stored internally by the recording device is input, and when the recording device is replaced, for example, a comparable printout can be achieved without changing, for example, the font specified on the externally connected device side.

Another aspect of the invention is a recording device that records characters on a recording medium according to a font specified by an externally connected device, the recording device including a plurality of internal fonts; and font substitution information that correlates the specified font to a different internal font based on any one of the line feed pitch of the recording medium, the width of the recording medium, a margin, the recordable printing area of the recording medium, and the recording resolution; and replacing the specified font with the different internal font based on the font substitution information when a font is specified by the externally connected device.

Because the font specified by an externally connected device is replaced by a different internal font based on any one of the line feed pitch of the recording medium, the width of the recording medium, a margin, the recordable printing area of the recording medium, and the recording resolution in this aspect of the invention, printout with an appearance that is comparable to that achieved using the specified font and that does not appear odd can be obtained without using the font specified by the externally connected device. As a result, when a command specifying a font that is not stored internally by the recording device is input, and when the recording device is replaced, for example, a comparable printout can be achieved without changing, for example, the font specified on the externally connected device side.

Preferably, the recording device records characters on roll paper as the recording medium.

When recording text on roll paper, this aspect of the invention replaces a specified font with a separate internal font based on the number of columns that can be recorded on one line in the specified font, or based on any one of the line feed pitch of the recording medium, the width of the recording medium, a margin, the recordable printing area of the recording medium, and the recording resolution, and therefore produce printout that is extremely similar in appearance to the printout using the specified font.

Further preferably, the font substitution information is information correlating fonts not stored in the recording device to internal fonts.

This aspect of the invention can record using an internal font when a font not stored internally in the recording device is specified, and can therefore produce printout that is extremely similar in appearance to the printout using the specified font.

Another aspect of the invention is a control method for a recording device that records characters on a recording medium according to a font specified by an externally connected device, including a step of using font substitution information that correlates the specified font to an internal font based on the recordable column count of the specified font per line on the recording medium to replace the specified font with a different internal font based on the font substitution information when a font is specified by the externally connected device.

Because the font specified by an externally connected device is replaced by a different internal font that can print approximately the same number of columns per line on the recording medium in this aspect of the invention, printout with a comparable appearance that does not appear odd can be obtained without using the font specified by the externally connected device.

Another aspect of the invention is a control method for a recording device that records characters on a recording medium according to a font specified by an externally connected device, including a step of using font substitution information that correlates the specified font to an internal font based on any one of the line feed pitch of the recording medium, the width of the recording medium, a margin, the recordable printing area of the recording medium, and the recording resolution, to replace the specified font with a different internal font based on the font substitution information when a font is specified by the externally connected device.

Because the font specified by an externally connected device is replaced by a different internal font based on any one of the line feed pitch of the recording medium, the width of the recording medium, a margin, the recordable printing area of the recording medium, and the recording resolution in this aspect of the invention, printout with an appearance that is comparable to that achieved using the specified font and that does not appear odd can be obtained without using the font specified by the externally connected device. As a result, when a command specifying a font that is not stored internally by the recording device is input, and when the recording device is replaced, for example, a comparable printout can be achieved without changing, for example, the font specified on the externally connected device side.

Another aspect of the invention is a program executed by a control unit for controlling a recording device that records characters on a recording medium according to a font specified by an externally connected device, wherein the control unit uses font substitution information that correlates the specified font to an internal font based on at least one of the recordable column count of the specified font per line on the recording medium, or any one of the line feed pitch of the recording medium, the width of the recording medium, a margin, the recordable printing area of the recording medium, and the recording resolution, to replace the specified font with a different internal font based on the font substitution information when a font is specified by the externally connected device.

As a result of the control unit executing the program, this aspect of the invention replaces a font specified by an externally connected device with another font that can record approximately the same number of columns per line on the recording medium with a comparable appearance, and can produce printout with a comparable appearance that does not appear odd without using the font specified by the externally connected device.

Effect of the Invention

When a recording command that specifies a font that is not stored in the recording device is input, the invention enables recording using a different font and thereby producing printout that is comparable in appearance and does not seem strange.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 3 is a flow chart describing the operation of the printer.
FIG. 4 shows an example of a change in the printout when a font is substituted.

DESCRIPTION OF EMBODIMENTS

A preferred embodiment of the present invention is described below with reference to the accompanying figures.

Figure 1:
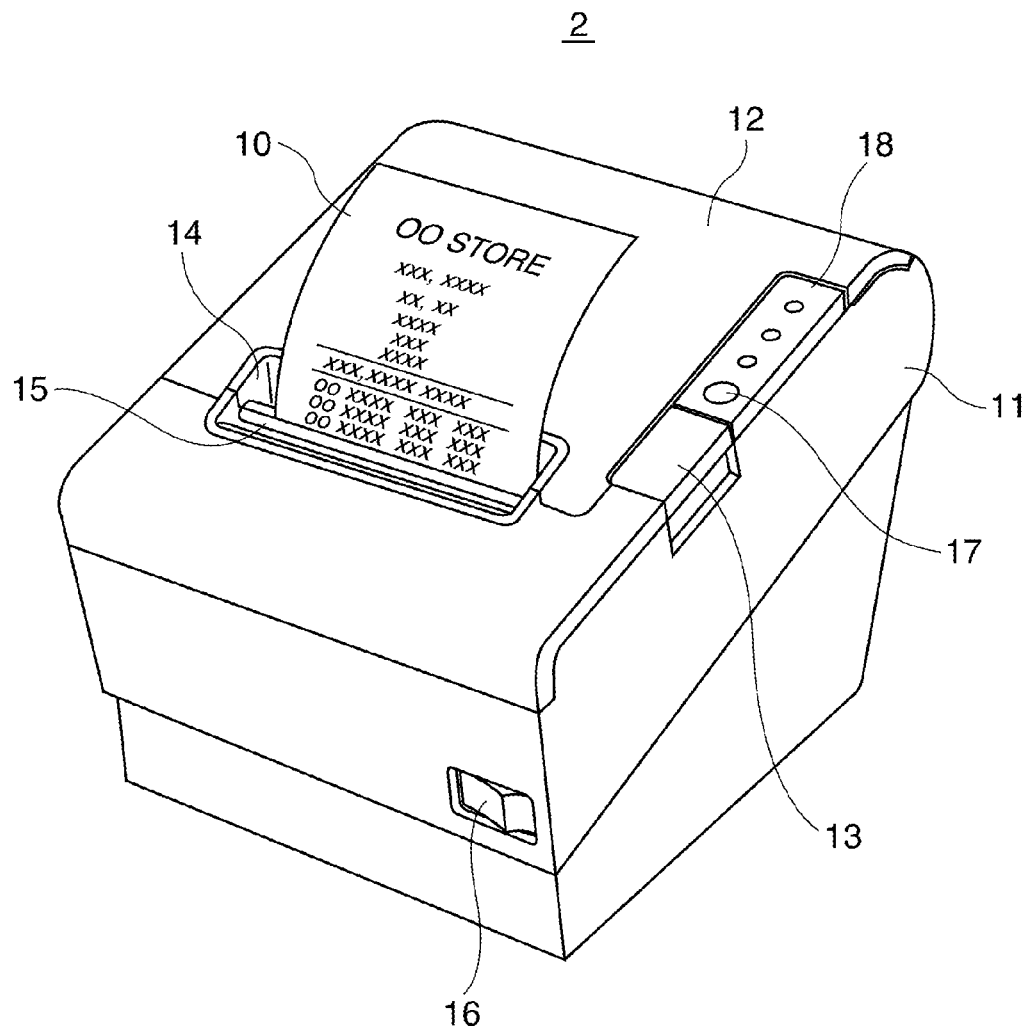
FIG. 1 is an oblique view of a printer according to a preferred embodiment of the invention.

FIG. 1 is an oblique view of a printer 2 according to this embodiment of the invention.

The printer 2 shown in FIG. 1 is a thermal printer that stores thermal roll paper 10 inside the case 11, and prints text and images on the roll paper 10 by means of a thermal head (not shown in the figure) inside the case 11 while conveying the roll paper 10 passed the thermal head. A cover 12 that can open and close is disposed to the case 11, and the cover 12 is released by depressing a lever 13. When the cover 12 is opened, a space for storing the roll paper 10 inside the case 11 is exposed, and the roll paper 10 can be loaded or replaced.

The printer 2 prints and outputs receipts in a retail store, for example, by printing (recording) a prepared logo and text on the roll paper 10.

A paper exit 14 for discharging the printed roll paper 10 is formed in the top of the printer 2 case 11. The printer 2 can also be installed with the paper exit 14 facing forward. A cutter 15 for cutting the roll paper 10 is disposed inside the paper exit 14. A power switch 16 for turning the printer 2 power on and off, another switch 17 for asserting a paper feed instruction or changing the operating mode, for example, and an LED unit 18 for displaying the operating status of the printer 2, for example, are disposed to the case 11.

Figure 2:
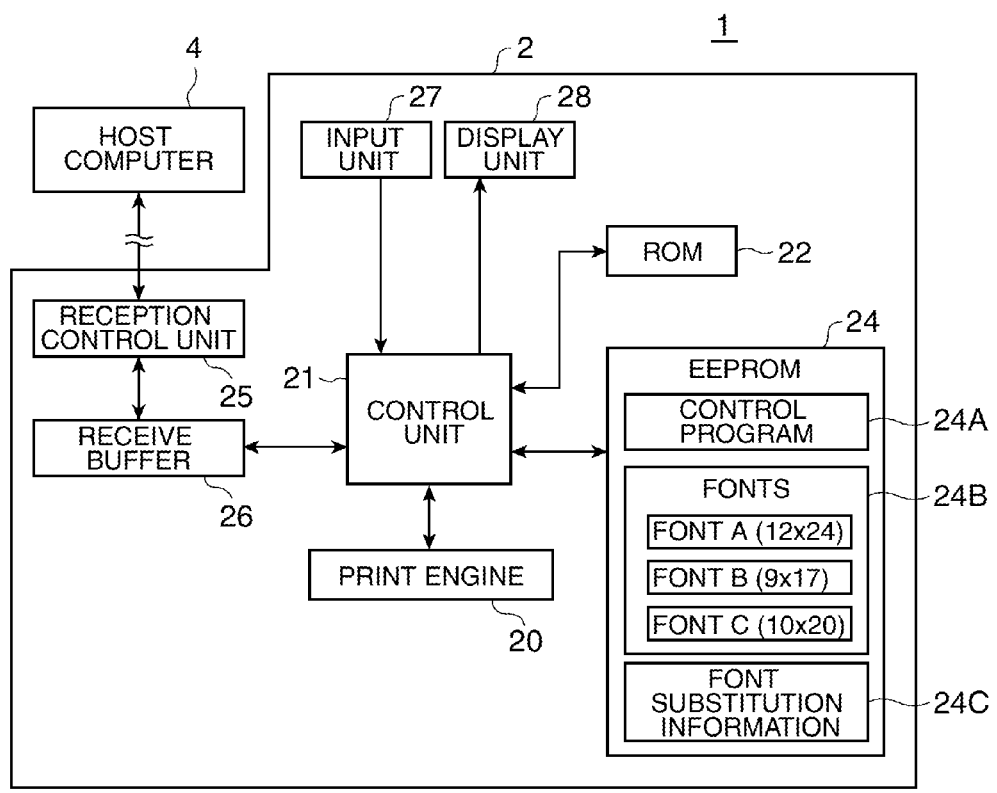
FIG. 2 is a block diagram showing the functional configuration of a printing system

FIG. 2 is a block diagram showing the configuration of a printing system 1 according to this embodiment of the invention.

The printing system 1 is rendered by connecting a host computer 4 to the printer 2, and is a system enabling the printer 2 to print the above-described receipts, for example, according to commands from the host computer 4.

The printer 2 includes the following components.
A print engine 20 that does the actual printing.
A control unit 21 that controls printer 2 operation.
ROM 22 that stores the basic control program executed by the control unit 21.
EEPROM 24 that stores another control program executed by the control unit 21.
A reception control unit 25 that controls receiving commands sent from the host computer 4.
A receive buffer 26 that temporarily stores commands and data trains received from the host computer 4.
An input unit 27 that detects switch 17 operation.
A display unit 28 that controls the LED unit 18 to display information.

The control unit 21 has a CPU and internal memory used as a working area for temporarily storing data and executed programs. The control unit 21 also functions as a microcontroller that executes the basic control program stored in ROM 22 and the control program 24A stored in EEPROM 24.

The print engine 20 renders the text or image printed on the roll paper 10 as controlled by the control unit 21 based on the print data and commands sent from the host computer 4. The print engine 20 also controls the printing mechanism of the printer 2 to print on the roll paper 10. More specifically, the printer 2 has a print head that applies heat to the printing surface of the roll paper 10, a print head drive mechanism that causes the print head to move relative to the roll paper 10, and a transportation mechanism that conveys the roll paper 10. The print head and other mechanisms are controlled by the print engine 20.

The ROM 22 stores a basic control program for initializing the various parts of the printer 2 and controlling said parts, and nonvolatilely stores data related to this basic control program.

The EEPROM 24 is a rewritable nonvolatile storage device, and stores programs and data including the control program 24A, fonts 24B (internal fonts), and font substitution information 24C. In the example shown in FIG. 1, font A (12 dots wide by 24 dots high), font B (10 dots wide by 20 dots high), and font C (9 dots wide by 17 dots high) are stored as the fonts 24B in EEPROM 24 and built in to the printer 2.

The reception control unit 25 implements a specific communication protocol with the host computer 4, receives signals sent from the host computer 4, demodulates (decodes) the received signals, and extracts and sequentially stores the commands and data trains in the receive buffer 26. The reception control unit 25 includes, for example, a connector connected to a communication cable and a communication circuit, or a wireless communication circuit and antenna, for example.

The receive buffer 26 is temporary storage that sequentially stores the commands and data output by the reception control unit 25, and the commands and data stored in the receive buffer 26 are acquired by the control unit 21.

The printer 2 executes a print job when the reception control unit 25 receives print data and a command instructing execution of a print job. The command instructing execution of a print job includes a command specifying the font to be used for printing. Of the plural fonts 24B stored in EEPROM 24, the control unit 21 uses the font specified by the received command to record on the roll paper 10 by means of the print engine 20.

Depending on the command from the host computer 4, a font that is not stored as one of the fonts 24B in EEPROM 24 may be specified. The printer 2 therefore has font substitution information 24C for replacing a font that is not stored in EEPROM 24 with a font 24B. This font substitution information 24C is information correlating fonts that are not stored in the printer 2 with the font to be substituted for that font. For example, if the font substitution information 24C is configured to substitute font B for font A, and font A is specified in the print job from the host computer 4, the control unit 21 executes the print job and records on the roll paper 10 using font B. By thus substituting fonts according to the font substitution information 24C, printing is possible even when a font that is not stored in EEPROM 24 is specified.

FIG. 3 is a flow chart describing the operation of the printer 2.

When the control unit 21 of the printer 2 receives a print job command and data from the host computer 4 through the reception control unit 25 (step S1), it checks if the font specified by the received command is stored as a font 24B in EEPROM 24 (step S2). If the specified font is stored as a font 24B in EEPROM 24 (step S2 returns Yes), the control unit 21 controls the print engine 20 using the font 24B, prints on the roll paper 10 (step S3), and ends the process.

However, if the font specified by the command is not stored as a font 24B in EEPROM 24 (step S2 returns No), the control unit 21 references the font substitution information 24C (step S4) and determines if a setting for replacing the specified font is included in the font substitution information 24C (step S5).

If a setting for the specified font is included in the font substitution information 24C (step S5 returns Yes), the control unit 21 substitutes the font according to the font substitution information 24C, prints using the substituted internal font (step S6), and ends the process.

If a setting for the specified font is not included in the font substitution information 24C (step S5 returns No), the control unit 21 outputs an error (step S7) and ends the process. This error may be output by driving the LED unit 18 appropriately or by sending an error signal to the host computer 4, for example.

FIG. 4 shows an example of the change in printout when a font is substituted. FIG. 4A shows an example of a slip printed using the specified font, that is, without substitution. FIG. 4B shows an example of the same slip printed using the substituted font. A receipt is used as an example of this slip.

In FIG. 4A and FIG. 4B W denotes the recording range of one line, L1 denotes the leading margin, and L2 and L3 denote the line feed distance (pitch).

The factors that determine the appearance of a font include the font size (width and height), character pitch, line thickness, and the shape of line endings. However, these factors are unique to each font, and preparing fonts with the same elements is not simple.

However, separately to these font elements, the appearance of the printout is also affected by the width and the number of columns that can be printed on the roll paper 10, the distance from the leading end of the roll paper 10 (the leading margin), the line pitch, the recordable area, and the print resolution, and finding a font with similar elements is not difficult.

The font substitution information 24C in this embodiment of the invention is therefore configured to replace fonts that are not stored in EEPROM 24 with an internal font of which at least one of the following factors is the same or similar as the specified font: the number of printable columns per line (the number of recordable columns), the size of the margin from the leading end of the roll paper 10 (leading margin size), the width of the roll paper 10, the line pitch (paper feed pitch), the recordable area, and the recordable resolution.

The number of printable columns per line of the roll paper 10 can be determined from the printable width, which is a unique value set in the printer 2 for the roll paper 10, the print resolution, which is determined from the specifications of the print head of the printer 2, and the character width and pitch of the font.

When the example shown in FIG. 4A and the example shown in FIG. 4B are compared, the results look different because the character widths of the fonts are different, but because the number of characters (columns) that can be printed per line is the same, the overall layout of the characters across the paper width is the same, and the printouts have a similar general appearance. The font substitution information 24C is thus configured so that the substituted fonts have at least the same number of printable columns per line. As a result, when a font that is not stored in the printer 2 is specified by a command from the host computer 4, the specified font is replaced by an internal font resulting in a printout that closely resembles the result printed with the specified font.

A more specific example is described below.

As shown in FIG. 1, font A that is built in to the printer 2 is a font that is 12 dots wide by 24 dots high. The printable width W of the printer 2 is 72 mm, the print resolution of the printer 2 is 8 dots/mm, and the number of printable dots per line is 576. The printable column width of 1 line is 576÷12=48 characters (columns) when font A is used, 57 characters when font B is used, and 64 characters when font C is used. Therefore, if font A is replaced by a different internal font, an internal font that prints the same or more characters per line than the 48 characters of font A is preferable, and the internal fonts satisfying this condition are set in the font substitution information 24C as the preferred internal fonts.

The font substitution information 24C may include information specifying the character pitch when using a preferred font by means of the dot count. This enables adjusting the character pitch to a desirable value, and ensuring that the number of printable columns per line is the same before and after font substitution.

The font substitution information 24C may also be configured so that the printout appears the same when printed on a printer with different specifications than printer 2.

For example, the printer 2 may replace a printer with a printable width W of 72 mm and a print resolution of 7 dots/mm. The number of dots printed per line by the replaced printer is 504 dots (72×7=504). The number of dots printed per line by printer 2, however, is 576 dots as described above. Because of this difference in print resolution, if printer 2 prints according to commands intended for this printer of different specifications, the printout will be different from the expected result. The font substitution information 24C is therefore configured so that the font substitution results in the expected printout when printed using one of the fonts built in to the printer 2. As a result, the expected printout can be achieved without changing the configuration of the host computer 4 when the printer is changed.

If the printer that is replaced (the "original printer") prints font C (9 dots wide by 17 dots high), the printable columns per line is 504÷9=56. In order for the new printer 2 to print 56 columns per line, font B (10 dots wide by 20 dots high) is preferred. The number of columns per line is not enough to print with font A, and the character pitch will be too great using font C. The font substitution information 24C of the printer 2 is therefore configured to substitute font B for the specified font C when the command from the host computer 4 specifies font C. In this situation font C is replaced by font B for printing even though font C is stored in EEPROM 24. The printout in this case results in 57 characters per line, which is substantially the same as when printed with font C on the original printer.

Note that as described above, the character pitch when using the pre-substitution font may include information specifying the dot count, for example, in the font substitution information 24C. The expected printout can therefore be more reliably achieved.

As described above, a recording device (printer 2) that records characters to a recording medium (roll paper 10) using a font specified by an externally connected device (host computer 4) has built-in fonts and font substitution information that correlates fonts specified by the externally connected device to the internal fonts based on the number of columns that can be printed on one line of the recording medium, and may be configured so that when a recording command that specifies a font for a recording device with different specifications is input from the externally connected device, the font specified by the externally connected device is replaced with another font based on the font substitution information. This configuration enables executing a record command intended for a recording device with different specifications and producing printout similar to the expected printout without changing the setup of the externally connected device.

In addition, the line feed pitch of the roll paper 10 can be determined based on the line pitch and the character size (height) of the font. Because the feed pitch L2 in the example shown in FIG. 4A and the feed pitch L3 shown in the example in FIG. 4B are the same, the general character layout in the height direction is the same, and the resulting printouts are similar in appearance. In addition, because the layout in the paper length direction is also affected by the leading margin L1 and where printing starts at the beginning, the printouts will be even more similar in appearance if these parameters are kept the same.

The internal font that is set in the font substitution information 24C for substitution may therefore be selected based on the feed pitch, leading margin, and recording start position so that these parameters are the same. In addition, so that the line feed pitch is reliably the same when an internal font is substituted for a specified font, the line feed pitch or line margin value may be set in the font substitution information 24C based on the size of the internal font that is substituted.

Furthermore, in addition to substituting an internal font set in the font substitution information 24C for a specified font, when the printer 2 prints based on the font substitution information 24C, the printer 2 may acquire the line feed pitch, margin between lines, or character spacing value set in the font substitution information 24C for the substituted internal font and control printing according to these values.

Figures 5A, 5B:
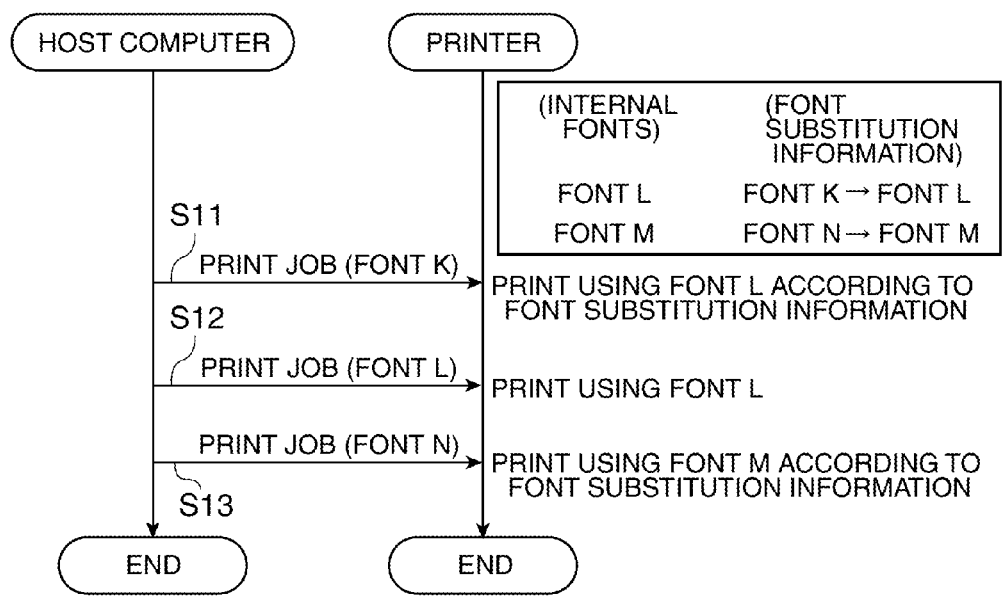
FIG. 5 is a sequence diagram showing a specific example of printing system operation.

FIG. 5 is a sequence diagram describing a specific example of the operation of the printing system 1. FIG. 5A shows the operation of the host computer 4, and FIG. 5B shows the operation of the printer 2.

In the operating example shown in FIG. 5, the printer 2 stores font L and font M in EEPROM 24. Font L is set as the substitution font for font K, and font M is set as the substitution font for font N, in the font substitution information 24C.

When a print job specifying font K is sent from the host computer 4 to the printer 2 (step S11), the printer 2 receives the print job. Because the specified font is not stored in EEPROM 24, the printer 2 references the font substitution information 24C, replaces font K with font L according to the settings in the font substitution information 24C, and prints.

When a print job specifying font L is sent from the host computer 4 to the printer 2 (step S12), the printer 2 receives the print job. Because the font specified in this print job is stored in EEPROM 24, the printer 2 prints using font L.

When a print job specifying font N is sent from the host computer 4 to the printer 2 (step S13), the printer 2 receives the print job. Because the specified font is not stored in EEPROM 24, the printer 2 references the font substitution information 24C, replaces font N with font M according to the settings in the font substitution information 24C, and prints.

As described above, in this embodiment of the invention, a printer 2 that prints text on roll paper 10 in a font specified by a host computer 4 stores fonts internally, and has font substitution information 24C that correlates fonts specified by the host computer 4 with the internal fonts 24B based on the number of columns per line that can be printed on the roll paper 10 used as the print medium. When a print command specifying a font is received from the host computer 4, the printer 2 replaces the specified font with another internal font based on the font substitution information 24C. As a result, because the font specified by the command from the host computer 4 is replaced by a different internal font that can print approximately the same number of columns per line on the roll paper 10, printout with a comparable appearance that does not appear odd can be obtained without using the font specified by the host computer 4. As a result, when a font that is not stored internally by the printer 2 is specified in a command from the host computer 4, and when a printer with specifications different from printer 2 is connected to the host computer 4 and replaced with printer 2, a printout comparable in appearance to the expected printout can be produced without changing the setup on the host computer 4 side.

The font substitution information 24C may be information that correlates a selected internal font to a specific font that is not stored in the printer 2 based on the line feed pitch of the roll paper 10, the margin, the size of the printable area of the roll paper 10, and the print resolution, for example. This enables producing a printout that is even closer to the appearance that is expected when the specified font is used.

In addition, because the printer 2 prints text on roll paper 10, a printout that is extremely close to the printout using the specified font can be achieved by replacing the specified font with a different internal font based on the number of columns that can be printed per line.

Yet further, by configuring the font substitution information 24C as information that correlates fonts not stored internally by the printer 2 to internal fonts, an internal font can be used to produce an extremely similar printout even when a font that is not stored internally by the printer 2 is specified. Printing compatibly with various fonts is therefore possible even when the capacity of the EEPROM 24 is limited.

The foregoing embodiment is one example of the invention, and the invention is not limited thereto. For example, the foregoing embodiment describes the font substitution information 24C as substituting one font for one different internal font, but the invention is not so limited. For example, one font could be substituted for a plurality of fonts.

In addition, the recording medium that can be used by the printer 2 is not limited to roll paper 10, and various types of sheet media, including cut-sheet paper and film, continuous paper, slips, and multipart forms, can be used. The recording device to which the invention can be applied is not particularly limited and can be any type of printer that operations according to commands, including inkjet printers, dot impact printers, laser printers, and dye sublimation printers. The invention can also be applied to printers that are incorporated in other devices.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

TEXT IN THE FIGURES

FIG. 2
HOST COMPUTER 4
RECEPTION CONTROL UNIT 25
RECEIVE BUFFER 26
INPUT UNIT 27
DISPLAY UNIT 28
ROM 22
CONTROL UNIT 21
PRINT ENGINE 20
EEPROM 24
CONTROL PROGRAM 24A
FONTS 24B
FONT SUBSTITUTION INFORMATION 24C
FONT A
FIG. 3
START
RECEIVE PRINT JOB
S2 INTERNAL FONT?
S3 PRINT USING SPECIFIED FONT
S4 REFER TO FONT SUBSTITUTION INFORMATION
S5 SETTING FOUND?
S6 PRINT USING SUBSTITUTE FONT
S7 OUTPUT ERROR
END
FIG. 5
HOST COMPUTER
S11 PRINT JOB (FONT K)
S12 PRINT JOB (FONT L)
S13 PRINT JOB (FONT N)
PRINTER
INTERNAL FONTS
FONT L
FONT M
FONT SUBSTITUTION INFORMATION
  FONT K-->FONT L
  FONT N-->FONT M
PRINT USING FONT L ACCORDING TO FONT SUBSTITUTION INFORMATION
PRINT USING FONT L
PRINT USING FONT M ACCORDING TO FONT SUBSTITUTION INFORMATION

What is claimed is:

1. A recording device that records characters on a recording medium according to a font specified by an externally connected device, comprising:
  a memory unit storing:
    a plurality of pre-stored internal fonts; and
    font substitution information that correlates the specified font to the plurality of pre-stored internal fonts based on a recordable column count of the specified font per line on the recording medium, a line feed pitch of the recording medium, a width of the recording medium, a margin, a recordable printing area of the recording medium, and a recording resolution;
  a control unit coupled to the memory unit and configured to:
    compare the font substitution information of the specified font to the font substitution information of each of the pre-stored internal fonts; and
    replace the specified font with the one of the pre-stored internal font based on the comparison of the font substitution information when the specified font is specified by the externally connected device, such that when the selected pre-stored internal font is recorded on the recording medium it appears similar to the specified font.

2. The recording device described in claim 1, wherein:
  the recording device records the characters on roll paper as the recording medium.

3. The recording device described in claim 1, wherein:
  the font substitution information is information correlating fonts not stored in the recording device to the internal fonts.

4. A control method for a recording device that records characters on a recording medium according to a font specified by an externally connected device, comprising the step of:
  using font substitution information for correlating the specified font to pre-stored internal fonts based on a recordable column count of the specified font per line on the recording medium, a line feed pitch of the recording medium, a width of the recording medium, a margin, a recordable printing area of the recording medium, and a recording resolution;
  compare the font substitution information of the specified font to the font substitution information of each of the pre-stored internal fonts; and
  replacing the specified font with the one of the pre-stored internal font based on the comparison of the font substitution information when the specified font is specified by the externally connected device, such that when the selected pre-stored internal font is recorded on the recording medium it appears similar to the specified font.

* * * * *